Figure 1:
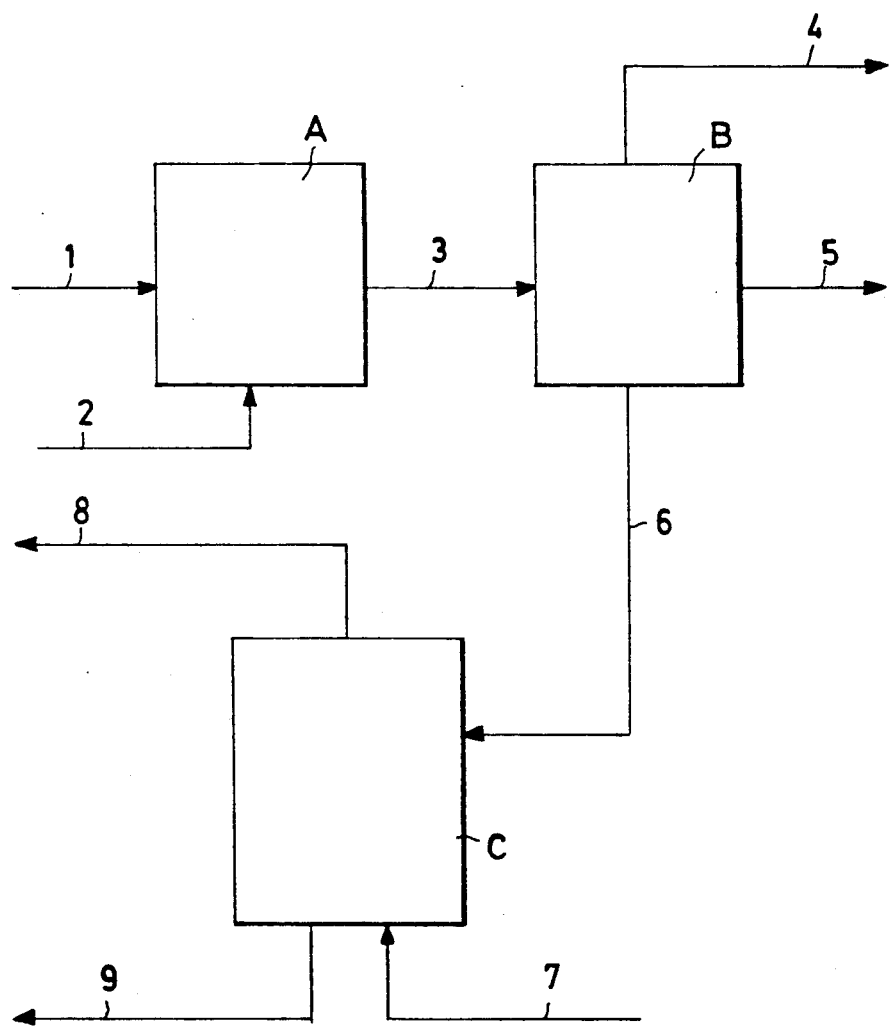

United States Patent [19]
Cimino et al.

[11] Patent Number: 5,135,655
[45] Date of Patent: Aug. 4, 1992

[54] PROCESS FOR TREATING REFINERY SLURRIES

[75] Inventors: Roberto Cimino, Milan; Salvatore Meli, Paullo, both of Italy

[73] Assignee: Eniricerche S.p.A., Milan, Italy

[21] Appl. No.: 764,613

[22] Filed: Sep. 24, 1991

[30] Foreign Application Priority Data

Oct. 5, 1990 [IT] Italy .................. 21645 A/90

[51] Int. Cl.$^5$ .............................. B01D 11/04
[52] U.S. Cl. ..................... 210/639; 210/671; 210/774; 210/634
[58] Field of Search ......... 210/634, 774, 806, 708, 210/671, 639

[56] References Cited
U.S. PATENT DOCUMENTS 3,716,474 2/1973 Hess et al. .................. 210/774 X

FOREIGN PATENT DOCUMENTS 0314223 5/1989 European Pat. Off. .
3038728 4/1982 Fed. Rep. of Germany .

Primary Examiner—Frank Spear
Attorney, Agent, or Firm—Shea & Gould

[57] ABSTRACT

Disclosed is a process for treating a refinery slurry containing water, oil and a solid fraction, wherein the slurry is brought into contact with carbon dioxide gas in order to adjust the pH value of said slurry to an acidic value and, in that way, improve the separation, by mechanical means, of a first water phase and a first oil phase, from a sludge. The latter is submitted to an extraction with carbon dioxide, under supercritical conditions, in order to separate a second water phase and a second oil phase from a residual sludge, which is disposed of.

The process makes it possible to remove most of the water, and, in particular, most of the oil contained in said slurry and a sludge to be disposed of which shows a reduced propensity to the elution of the residual oil.

9 Claims, 2 Drawing Sheets

PROCESS FOR TREATING REFINERY SLURRIES

The present invention relates to a process for treating a refinery slurry, which process is suitable for reducing the content of water and, in particular, of oil, in said slurry, and give the residual sludge a reduced propensity to undergo phenomena of elution of oil, so as to facilitate the disposal of said sludge.

In the refinery operations, such as crude oil distillation, catalytic cracking, reforming, alkylation and the like, waste water streams are generated which are usually submitted to primary treatments, (decantation and clarification/flocculation), and to secondary treatments (active sludge biological treatment). The so treated waste streams are the refinery slurries, i.e., mixtures of oil and solids dispersed in water matrixes, with the whole system being stabilized by the surfactant agents naturally occurring in crude oil. The solids are generally of inorganic nature, such as sand and clay, and of organic nature, such as asphaltenes, coke, microbial colonies deriving from the treatment of the waste streams with activated sludges, and so forth. An aliquot of water and oils contained in said refinery slurry are generally separated by mechanical processes (filtration/centrifugation). The residues from these operations are water-rich sludges, containing considerable amounts of oils.

These sludges can be submitted to oxidation and incineration treatments, or they can be buried in suitable landfills, which can be more or less far away from the refinery. In any case, disposing of said sludges causes a certain number of problems. So, the incineration treatments may give rise to phenomena of atmospheric pollution, and, in any case, they require the adoption of complex equipment, difficult to be managed. Furthermore, in case said slurries are buried in landfills, the problem exists, which derives from the mass of sludges to be transported, on considering that said sludge is mainly composed by water. Other problems derive from the oil content in the sludge to be buried, and from the propensity of the oil to be eluted from said sludge, a matter of fact which determines the type of landfill which can be used, on considering the pollution problems and of the applicable regulations.

In European Patent Application Publication No. 314,223, a process is disclosed in which a sludge is submitted to extraction with carbon dioxide, under supercritical conditions, in order to separate a liquid fraction (water and hydrocarbons) from a residue which can be directly disposed of into the landfill.

The present Applicant has found now, according to the present invention, that a modification in the pH value of the original slurry, accomplished by contacting said slurry with carbon dioxide gas, makes it possible to obtain substantial improvements to be obtained in the preliminary separation of oil and water from the same slurry. The present Applicant found, moreover, that the sludge originated in this treatment can be submitted to an extraction with carbon dioxide, under supercritical conditions, in order to further reduce its content of water and oil. On such a basis, it renders it possible to considerably improve the recovery of oil from a slurry, and a residual sludge of reduced volume and not tending to undergo oil elution, to be disposed of.

In accordance therewith, the present invention relates to a process for the treatment of a slurry essentially constituted by an emulsion of oil-in-water type, containing, in suspension, organic and inorganic solids, which process is characterized in that:

(a) said slurry is brought into contact with carbon dioxide, in order to adjust the pH value of said slurry at an acidic value, and the separation of a first aqueous phase and a first oil phase from a sludge is caused;

(b) the sludge from (a) is submitted to an extraction with carbon dioxide, under supercritical conditions, in order to separate a second aqueous phase and a second oil phase from a residual sludge;

(c) the aqueous and oil phases are recovered, and the residual sludge from (b) is disposed of.

The slurries which are treated according to the process of the present invention are essentially constituted by an emulsion of oil-in-water type, with a water content normally higher than 50% by weight, which contains in suspension solids of organic or inorganic nature. Typically, these slurries have a neutral or approximately neutral pH value and contain from 3 to 12 % by weight of oil, from 88 to 96% of water and from 1 to 3% by weight of solid matter.

According to the present invention, in the (a) step of the process, the slurry is brought into contact with carbon dioxide gas in order to adjust the pH value of said slurry to an acidic value, and, typically, within the range of from about 4.4 to about 6.5. In the preferred form of practical embodiment, the slurry is saturated with carbon dioxide at room temerature and pressure, so as to decrease the pH value of said slurry down to values of the order of 6.2-6.4. However, lower pH values can be obtained by operating under a carbon dioxide pressure, of, e.g. up to approximately 25 bars. This treatment with carbon dioxide makes it possible to destabilized the emulsion, thus rendering it easier to separate a first oil phase, a first water phase and a sludge from said slurry. This separation can be advantageously carried out by centrifugation.

According to the process of the present invention, the sludge originated in the (a) step is submitted to an extraction with carbon dioxide, under supercritical conditions, in order to cause a further amount of oil and water to separate from the sludge. By "supercritical conditions", it is meant herein that this extraction is carried out at temperatures higher than the critical value (31° C.) and under pressures equal to, or higher than, the critical value (73.8 bars) of carbon dioxide. Normally, the pressure is selected as a function of the operating temperature, in such a way that the density of supercritical carbon dioxide is such as to supply a value of the solubility parameter (the solubility parameter constitutes a measurement of the affinity of the solvent for a generic apolar compound), close to the solubility parameter of the oil to be extracted. In particular, the temperature range within which this step is carried out ranges from 32° C. to 120° C., and preferably is comprised within the range of from 35° C. to 90° C., and the corresponding pressures may be comprised within the range of from 73.8 bars to 500 bars, and preferably of from 100 bars to 350 bars. In practice, this sludge from the (a) step is charged to an extractor and through said sludge a stream of carbon dioxide under supercritical conditions is caused to flow. In that way, carbon dioxide extracts water and oil from said sludge, and the stream leaving the extractor is sent to a separator, operating under conditions different from supercritical conditions. Inside said separator, carbon dioxide evolves and water and oil separate in liquid form. Inside said separator, the spontaneous phase separation takes place, with an aqueous phase and an oil phase being separated, which are recovered.

By means of the process according to the present invention, it is possible to attain de-oiling rates of the slurry, which typically are of the order of 70% relative to the weight of oil, with reductions in weight of more than 70% of the weight of the initial slurry. The fact is stressed that the process according to the present invention does not cause foreign chemicals to be added to the starting slurry, in that carbon dioxide can be recovered to a substantially complete extent from the effluents from the same treatment.

FIG. 1 of the accompanying drawings shows a flow diagram relevant to the treatment of the slurries according to the present invention.

Figure 2:
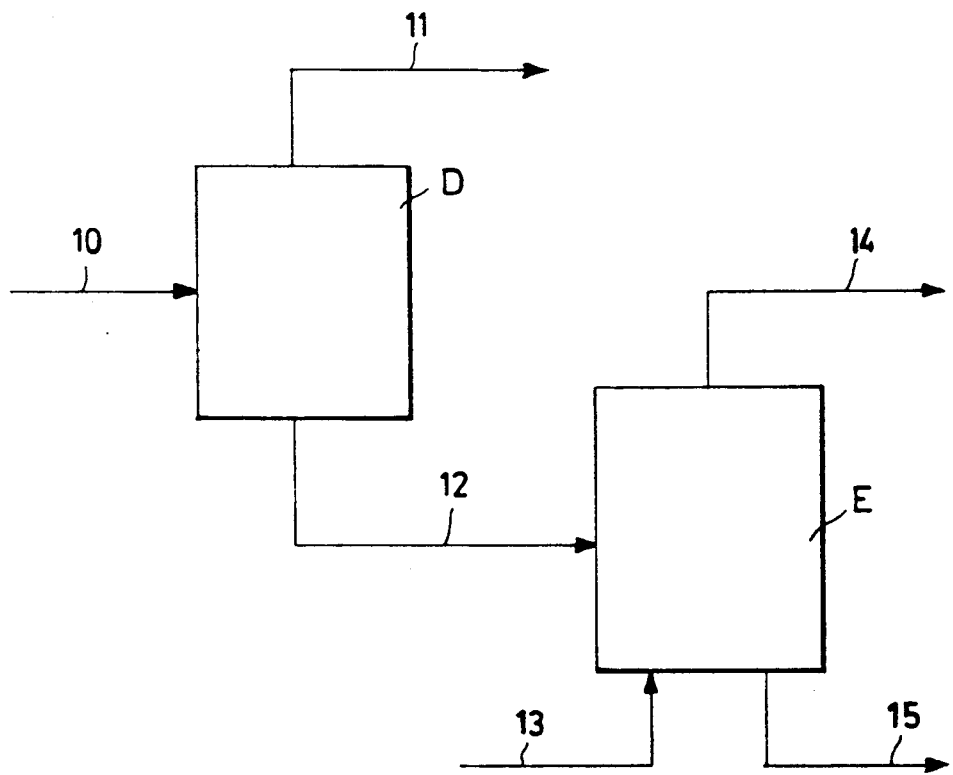

FIG. 2 shows a flow diagram relevant to the treatment of slurries according to a typical process known from the prior art.

In the following experimental examples, a slurry is used which has a pH value of 6.96 and contains 87.9% by weight of water, 8.8% by weight of oil and 3.3% by weight of solid matter. The water content is determined by analysis carried out according to Marcusson method, and the value is confirmed by calorimetric analysis carried out by means of the DSC (Differential Scanning Calorimeter), with a temperature gradient of 1° C./minute from $-100°$ C. to 500° C. The melting peak at 0° C. makes it possible to evaluate the water content.

The determination of water, of low- and medium-boiling hydrocarbons and of the organic solids is furthermore carried out by thermogravimetric analysis under nitrogen at temperatures of from 26° to 800° C., with a temperature gradient of 3° C./minute, and following heating in air up to 900° C., with a gradient of 50° C./minute.

EXAMPLE 1

A sample of slurry, having the characteristics reported in the above disclosure, is submitted to centrifugation in a laboratory centrifuge running at 2,500–3,000 revolutions per minute (rpm) for 5 minutes, so as to separate an aqueous phase, an oil phase and a sludge. The test is carried out on the pristine slurry, having a pH value of 6.96 (Test 1); on said slurry saturated with carbon dioxide at atmospheric pressure, with a pH value of 6.3 (Test 2); and on the slurry, to which concentrated sulfuric acid was added in such an amount as to lower the pH value down to 4.0 (Test 3).

The tests are carried out at room temperature (20°–25° C.). Tests 2 and 3 are comparison tests. In Table I the distribution is reported, as percent by weight, of the aqueous phase, of the oil phase and of the sludge, which was obtained from the three centrifugation tests. In Table II, the composition is reported, as percent by weight, of the sludge separated in the three tests, together with the values of the oil/solid matter ratio observed in the sludge. In Table III, the values are reported of the decrease in slurry weight and of the de-oiling rate, both expressed as percent by weight, which were obtained in said three tests.

Relative to the centrifugation carried out at natural pH value (Test 1), in tests 2 and 3 much higher values are obtained of slurry weight decrease and de-oiling rate, and the oil/solid matter ratio in the generated sludge is considerably lower.

TABLE 1

| (Distribution of slurry after centrifugation) | | | |
|---|---|---|---|
| Test | 1 | 2 | 3 |
| Aqueous phase | 51.5 | 58.2 | 53.3 |
| Oil phase | 11.3 | 14.0 | 18.2 |
| Sludge phase | 37.2 | 27.8 | 28.5 |

TABLE II

| (Sludge composition) | | | |
|---|---|---|---|
| Test | 1 | 2 | 3 |
| Oil | 16 | 11.9 | 12 |
| Water | 79 | 77.5 | 76 |
| Solid | 6 | 10.6 | 12 |
| Oil/sludge ratio | 2.7 | 1.1 | 1.0 |

TABLE III

| (Sludge weight decrease and de-oiling rate) | | |
|---|---|---|
| Test | Weight reduction | De-oiling rate |
| 1 | 62.8 | 32.4 |
| 2 | 72.2 | 62.4 |
| 3 | 71.5 | 61.1 |

EXAMPLE 2

Referring to FIG. 1 of the accompanying drawing tables, 100 parts by weight of the slurry having the characteristics reported in the above disclosure are charged to the vessel (A) through the line (1), and the slurry is saturated with carbon dioxide, fed through the line (2). Inside vessel (A), the process is carried out at room temperature (20°–25° C.) and at the pressure of 1 $kg/cm^2$, and a slurry with a pH value of 6.3 is obtained, which is fed to the centrifuge (B) through the line (3). The slurry is centrifuged for approximately 5 minutes at 2,500–3,000 rpm, and 58.2 parts by weight, 14.0 parts by weight and 27.8 parts by weight are recovered of a first aqueous phase [line (4)], of a first oil phase [line (5)] and of a first sludge [line (6)], respectively. Said first sludge [line (6)] has the following composition: 3.3 parts of oil, 21.5 parts of water and 3.0 parts of solid matter. The sludge is submitted to extraction in the extractor (C), with carbon dioxide fed through line (7). In particular, in the extractor (C), the process is carried out under supercritical conditions, with a temperature of 40° C. and a pressure of 150 bars, with 36.6 parts by weight of carbon dioxide per each part by weight of said sludge being fed within a two-hour time. At the end of this treatment, from the extractor (C) a second oil phase and a second aqueous phase, in a total amount of 5.2 parts —which are both withdrawn by carbon dioxide, which is discharged through the line (8)—and 22.6 parts by weight of a second sludge [line (9)] are separated. This second sludge contains 2.6 parts of oil, 17.0 parts of water and 3.0 parts of solids.

Therefore, the total de-oiling rate of the slurry is of 70.4% by weight, relative to the weight of initially present oil, and the reduction in slurry weight is of 77.4% relative to the initial weight of said slurry.

On the second sludge, the standard tests of elution with water and acetic acid (pH value of about 5), are carried out according to the Release Test Procedure with 0.5M Acetic Acid, as published in "Quaderni Istituto Ricerche sulle Acque" 64, Volume 3, Metodi Analitici per i Fanghi [Analytic Methods for Sludges], January 1985. The amount of total eluted hydrocarbons is shown to be of 1.2 parts per million (ppm) (9.0 ppm dry basis).

EXAMPLE 3 (COMPARISON EXAMPLE)

For comparison purposes, a slurry treatment test is carried out by operating according to the technique known from the prior art. More particularly, referring to FIG. 2 of the accompanying drawing tables, 100 parts by weight of a slurry containing 94.4% by weight of water, 3.3% by weight of oil and 2.1% by weight of solid matter, is fed, through the line (10) to the filtering device (D). From the filter, 85 parts by weight of water [line (11)] and 15 parts by weight [line (12)] of a concentrated slurry are respectively discharged, and the latter is fed to the extractor (E), together with carbon dioxide [line (13)]. In the extractor (E), the process is carried out under supercritical conditions, at a temperature of 40° C., and with a pressure of 150 bars, with 34.3 parts by weight of carbon dioxide per each part by weight of feedstock being fed within a two-hour time.

At the end of this treatment step, from the extractor (E) the following are separated: an oil phase and an aqueous phase, in a total amount of 3.5 parts, which are discharged together with carbon dioxide [line (14)]; and a sludge [line (15)], containing 1.4 parts of oil, 8.3 parts of water and 1.8 parts of solid.

Therefore, the de-oiling rate of the slurry is of 57.6% by weight, relative to the weight of the initially present oil, and the slurry weight reduction is of 88.5% relative to the initial weight.

On the sludge the standard elution tests are carried out, by the same procedure as reported in Example 2, and an amount of total eluted hydrocarbons of 1.2 ppm (7.7 ppm, dry basis) is determined.

We claim:

1. Process for the treatment of a slurry essentially constituted by an emulsion of oil-in-water type, containing, in suspension, organic and inorganic solids, which process is characterized in that:
   (a) said slurry is brought into contact with carbon dioxide, in order to adjust the pH value of said slurry at an acidic value, and the separation of a first aqueous phase and a first oil phase from a sludge results;
   (b) the sludge from (a) is submitted to an extraction with carbon dioxide, under supercritical conditions, in order to separate a second aqueous phase and a second oil phase from a residual sludge;
   (c) the aqueous and oil phases are recovered, and the residual sludge from (b) is disposed off.

2. Process according to claim 1, characterized in that said slurry is an emulsion of oil-in-water type, with a water content normally higher than 50% by weight.

3. Process according to claim 1, characterized in that in the (a) step, the pH value of the slurry is adjusted at a value comprised within the range of from about 4.4 to about 6.5.

4. Process according to claim 1, characterized in that said pH value is adjusted at a value of 6.2-6.4 by saturation with carbon dioxide at room temperature and room pressure.

5. Process according to claim 1, characterized in that the separation of the aqueous phase and of the oil phase from the sludge, in the (a) step, is carried out by centrifugation.

6. Process according to claim 1, characterized in that in the (b) step, the process is carried out at a temperature of from 32° C. to 120° C., and at a pressure of from 73.8 to 500 bars.

7. Process according to claim 2, characterized in that the slurry has a neutral or approximately neutral pH value, and contains from 3 to 12% by weight of oil, from 88 to 96% by weight of water and from 1 to 3% by weight of solid matter.

8. Process according to claim 6, characterized in that in the (b) step, the process is carried out at a temperature of from 35° C. to 90° C.

9. Process according to claim 8, characterized in that in the (b) step, the process is carried out at a pressure of from 100 to 350 bars.

* * * * *